(12) United States Patent
Kashiwagi et al.

(10) Patent No.: US 7,104,696 B2
(45) Date of Patent: Sep. 12, 2006

(54) BEARING DEVICE

(75) Inventors: Shinichirou Kashiwagi, Yao (JP);
Naoki Morimura, Kashiba (JP);
Kazutoshi Toda, Habikino (JP);
Tadashi Mitarai, Kashiwara (JP);
Nobuyoshi Murakami, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 11/174,491

(22) Filed: Jul. 6, 2005

(65) Prior Publication Data
US 2005/0244089 A1    Nov. 3, 2005

Related U.S. Application Data

(60) Continuation of application No. 10/084,187, filed on Feb. 28, 2002, now abandoned, which is a division of application No. 09/392,240, filed on Sep. 8, 1999, now Pat. No. 6,398,419.

(51) Int. Cl.
*F16C 19/28* (2006.01)

(52) U.S. Cl. .................................................. 384/537
(58) Field of Classification Search ................ 384/537, 384/448, 544, 585, 589
See application file for complete search history.

(56) References Cited

U.S. PATENT DOCUMENTS

| | | |
|---|---|---|
| 4,893,960 A | 1/1990 | Beier et al. |
| 5,226,738 A | 7/1993 | Valette et al. |
| 5,490,732 A | 2/1996 | Hofmann et al. |
| 5,544,962 A | 8/1996 | Hofmann et al. |
| 6,113,279 A | 9/2000 | Sawai et al. |
| 6,443,622 B1 | 9/2002 | Webb et al. |

*Primary Examiner*—Lenard A. Footland
(74) *Attorney, Agent, or Firm*—Birch, Stewart, Kolasch & Birch, LLP

(57) ABSTRACT

A bearing device in which a rolling bearing is fitted on one axial end of a shaft and in which the one axial end of the shaft is caulked to fix the rolling bearing while preventing the same from coming out. The shape of the outer end face of the caulked portion is devised to maximize the resistance to the coming-out by the caulked portion.

3 Claims, 17 Drawing Sheets

F I G. 2
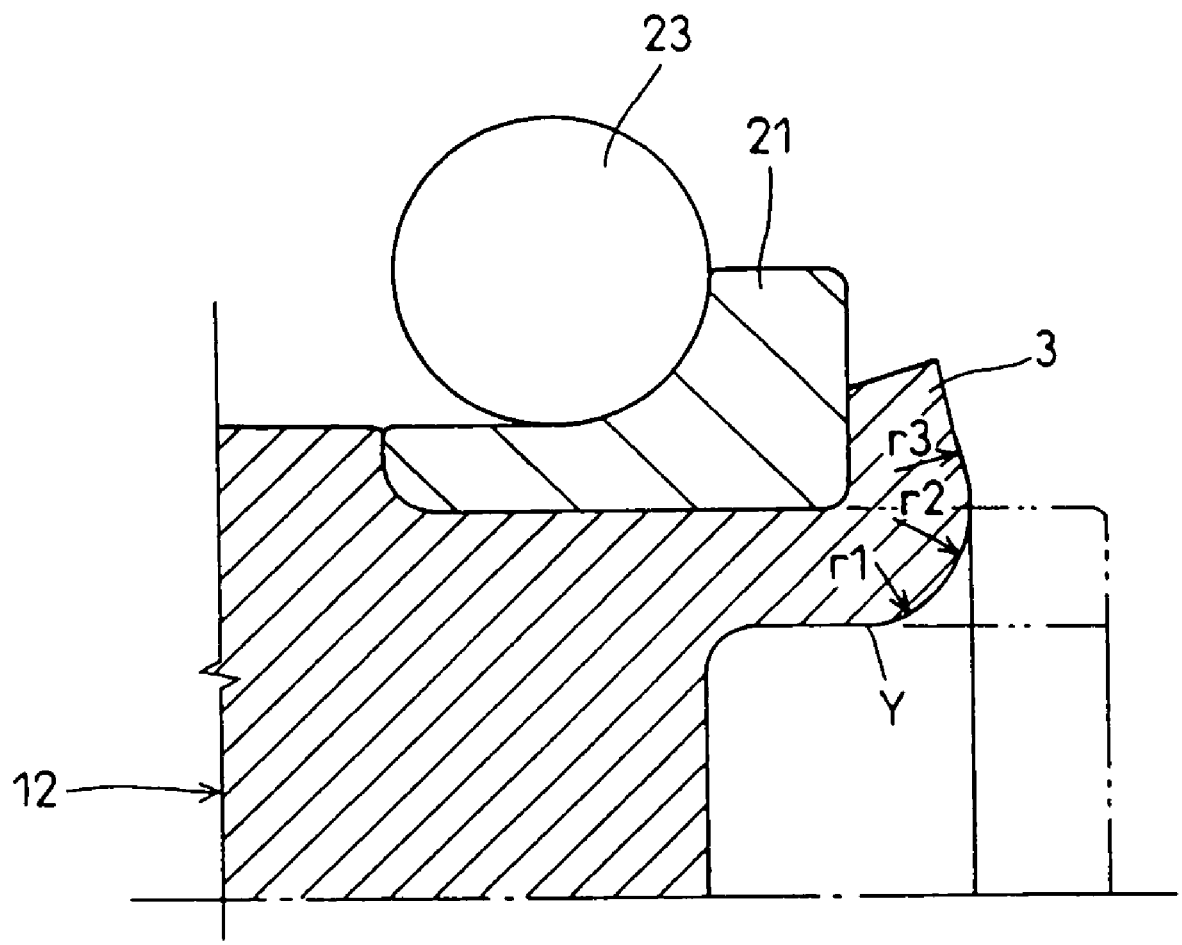

F I G. 12
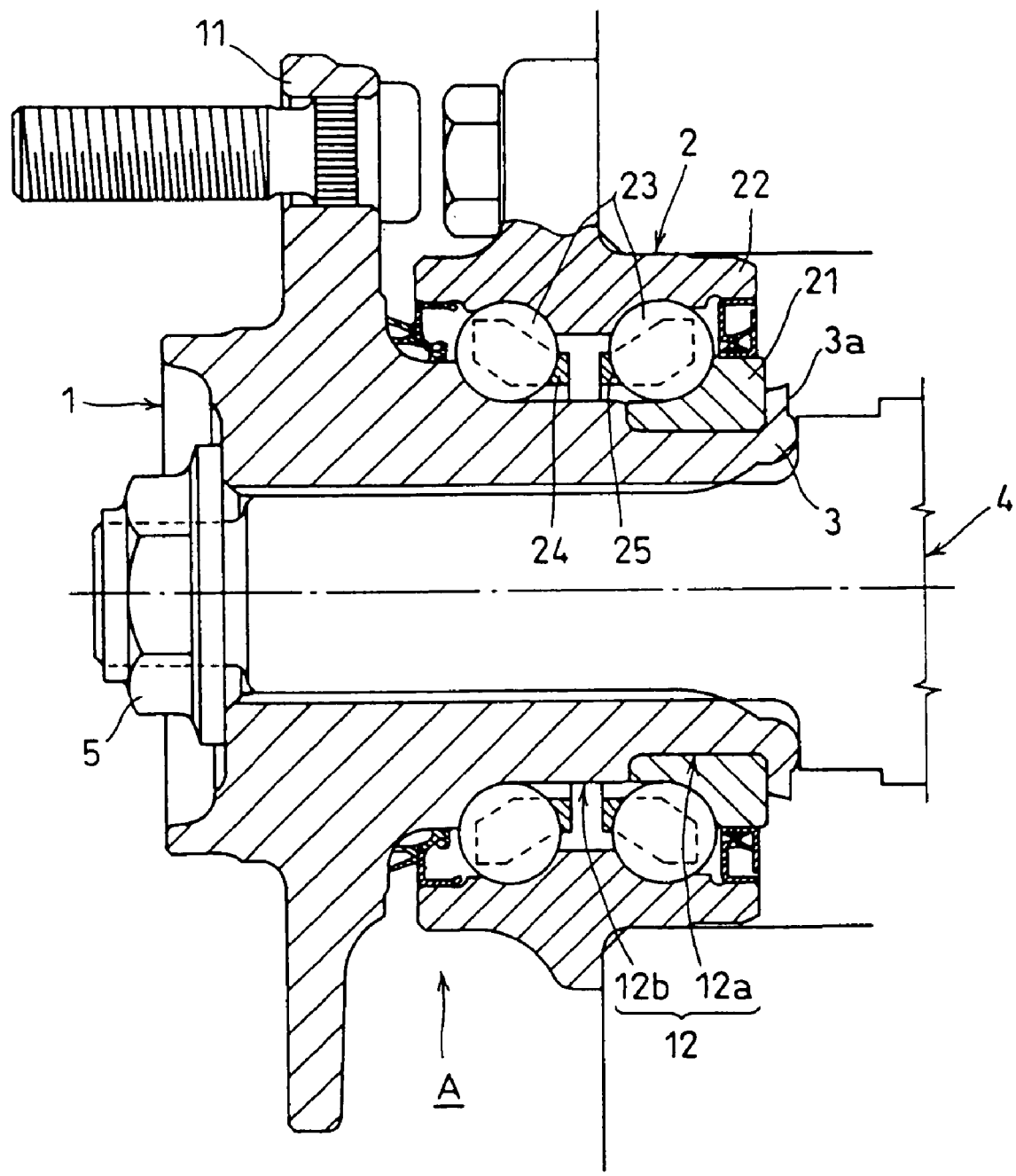

F I G. 18
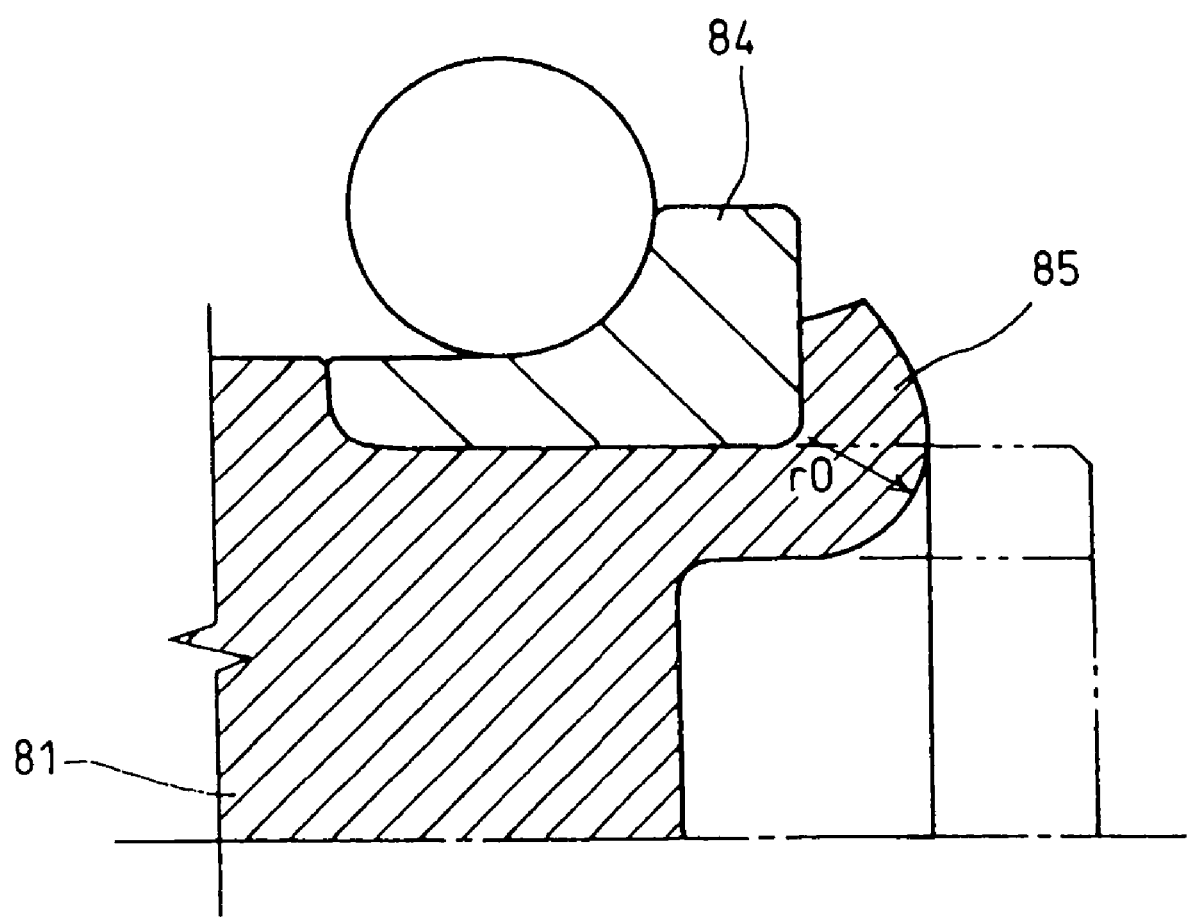

BEARING DEVICE

This application is a Continuation of application Ser. No. 10/084,187 filed on Feb. 28, 2002 now abandoned, which is a Divisional of Application Ser. No. 09/392,240 filed Sep. 8, 1999, now U.S. Pat. No. 6,398,419 issued Jun. 4, 2002, the entire contents of each are hereby incorporated by reference and for which priority is claimed under 35 U.S.C. § 120.

BACKGROUND OF THE INVENTION

1. Field of the Invention

The present invention relates to a bearing device having a rolling bearing fitted on a shaft. This bearing device can be utilized, for example, in the fields of a vehicular hub unit or a guide roller of the slide door of an automobile, and in other general fields of bearing devices.

2. Description of the Related Art

With reference to FIG. 17, a vehicular hub unit will be described as one example of the bearing device. In this hub unit B, a double row angular contact ball bearing 82 with vertex of contact angles outside of bearing is fitted on a journal 81 of a hub wheel 80. The free end of the journal 81 is rolled-caulked to bend radially outward. This bent caulked portion 85 is pushed onto the outer end face of an inner ring 84 of the bearing 82. As a result, the bearing 82 is so fixed on the hub wheel 80 as to be prevented from coming out.

The caulked portion 85 is so curved as to have an entirely roundish outer end face, as shown in FIG. 18. The curve at the outer end face of the caulked portion 85 has a single radius of curvature r0.

The cylindrical free end of the journal 81 at the hub wheel 80 is rolled-caulked by using a caulking jig 90, as shown in FIG. 19. At this time, the leading end of the caulking jig 90 is applied to the journal 81 and is rolled at a predetermined angle $\theta$ on a single-dotted line O. As a result, the free end of the journal 81 is bent radially outward so that the inner ring 84 is prevented from coming out by the bent caulked portion 85.

In the example of the prior art thus far described, the shape of the outer end face of the caulked portion 85 is not strictly managed. This outer end face of the caulked portion 85 usually has a roundish shape. As a result, the shape of the caulked portion 85 may disperse for the caulking works. In an extreme case, the radially intermediate portion of the caulked portion 85 may leave and float over the inner ring 84. In this case, a resistance to a coming-out load, i.e., a coming-out resistance has a tendency to fall short.

On the other hand, the outer end face of the caulked portion 85 may be formed of a curve having a single radius of curvature r0. The caulked portion 85 of this outer end face shape is achieved by a caulking treatment under a substantially constant pressure from the initial to final stages of the caulking process. In this case, too, there occurs the aforementioned defect.

Against this defect, it is conceivable to inspect the finished state of the caulked portion 85 visually after the caulking treatment. Since the outer end face of the caulked portion 85 has the roundish shape, however, it is impossible to confirm from the appearance whether or not the floating state has occurred.

SUMMARY OF THE INVENTION

It is, therefore, a main object of the invention to provide a bearing device which improves the coming-out resistance by the caulked portion.

Another object of the invention is to provide a bearing device which not only improves the coming-out resistance by the caulked portion but also facilitates a decision even when the caulked portion is to be visually inspected.

The features and advantages of the invention will become apparent from the description to be made in the following.

According to a first aspect of the invention, there is provided a bearing device comprising: a shaft having one axial end formed into a cylindrical shape; and a rolling bearing fitted on the one axial end of the shaft, wherein the rolling bearing is so fixed on the shaft as to be prevented from coming out by rolling-caulking the one axial end of the shaft to bend it radially outward and by pushing the bent caulked portion onto the outer end face of the inner ring of the rolling bearing, and wherein the region at the outer end face of the caulked portion from the bending start point to the outer circumferential edge is formed of a composite curve joining curved surfaces of at least two different radii of curvature.

In the bearing device of this first aspect, the radii of curvature of the individual curved surfaces of the composite curve are preferably set to the larger value at the radially outer side.

The caulked portion of this shape is specialized, for example, by adjusting the pressure on the inner ring in the caulking process. Depending upon the caulking mode, the caulked portion can be pushed at its substantially entire area substantially homogeneously onto the outer end face of the inner ring, and the axial thickness can be enlarged as much as possible. As a result, the coming-out resistance by the caulked portion can be increased more than the prior art.

According to a second aspect of the invention, there is provided a bearing device comprising: a shaft having one axial end formed into a cylindrical shape; and a rolling bearing fitted on the one axial end of the shaft, wherein the rolling bearing is so fixed on the shaft as to be prevented from coming out by rolling-caulking the one axial end of the shaft to bend it radially outward and by pushing the bent caulked portion onto the outer end face of the inner ring of the rolling bearing, and wherein a flat face extending in a radial direction is formed at a predetermined region of the outer end face of the caulked portion.

In the bearing device of this second aspect, the flat face of the caulked portion is preferably formed at the axially outermost end of the outer end face of the caulked portion.

The caulked portion thus shaped is pushed in its entirety to the inner ring in the process for forming the flat face so that the it can be easily fitted on the outer end face of the inner ring thereby to increase the coming-out resistance by the caulked portion more than the prior art.

Moreover, the flat face to be formed on the outer end face of the caulked portion can be said to provide a shaping feature. This will be reasoned in the following. If the caulked portion were entirely fitted on the inner ring, the flat face would be neatly formed. If even a portion of the caulked portion were floating over the inner ring, the flat face would have undulations. If the state of the flat face is employed as a reference for the decision when the finished state of the caulked portion is to be visually inspected, therefore, the visual decision is facilitated.

If the flat face is positioned at the axially outermost end of the caulked portion, on the other hand, it provides a reference plane for determining the axial width size of the caulked portion. By managing that flat face, therefore, the entire length size of the bearing device is easily set. On the other hand, the flat face provides a mounting reference plane for an object to be mounted on the bearing device of the invention, so that the axial size in the mounted state can be managed highly accurately.

BRIEF DESCRIPTION OF THE DRAWINGS

These and other objects as well as advantages of the invention will become clear by the following description of preferred embodiments of the invention with reference to the accompanying drawings, wherein:

FIG. 2 is an enlarged section of the caulked portion of FIG. 1;

FIG. 12 is a longitudinal side section of a vehicular hub unit according to a fourth preferred embodiment of the invention;

FIG. 18 is an enlarged section of the caulked portion of FIG. 17; and

In all these figures, like components are indicated by the same numerals.

DETAILED DESCRIPTION OF THE INVENTION

FIRST EMBODIMENT OF THE INVENTION

Figure 1:
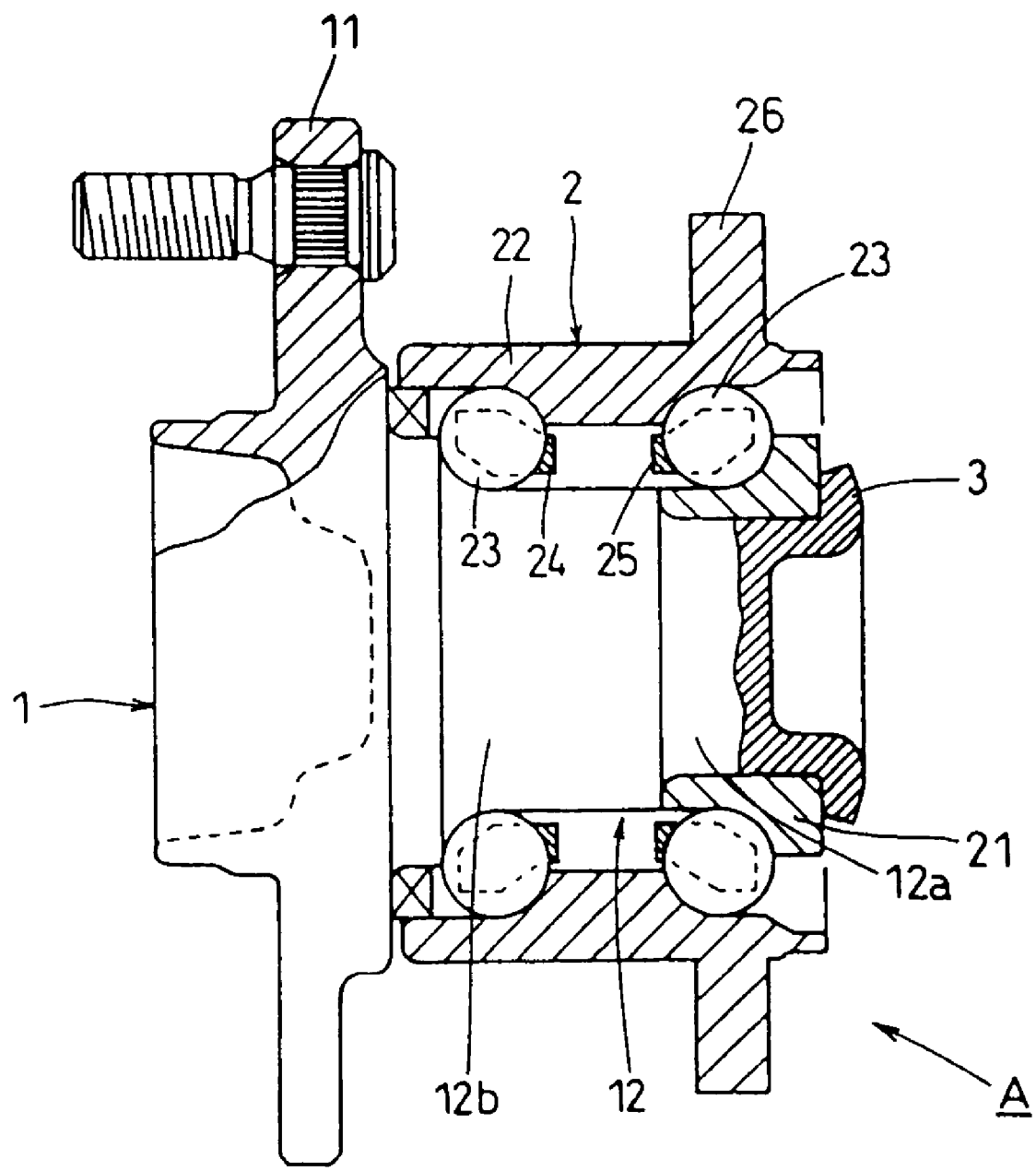
FIG. 1 is a longitudinal side section of a vehicular hub unit according to a first preferred embodiment of the invention.
Figure 3A:
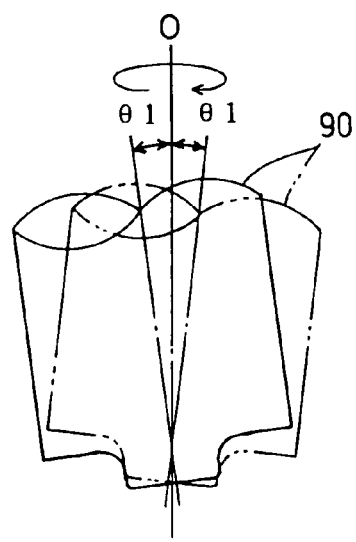
FIGS. 3A to 3C present process diagrams for explaining the caulking mode of the caulked portion of FIG. 1.
Figure 3B:
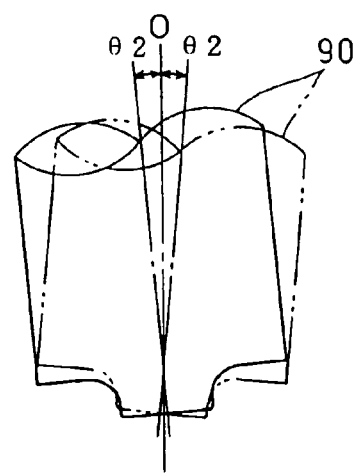
Figure 3C:
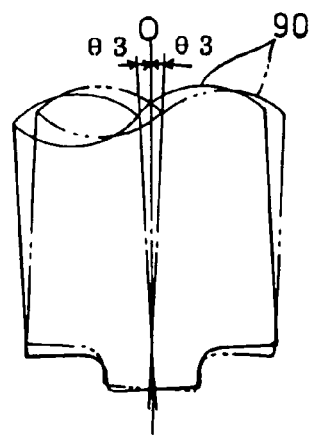

A first preferred embodiment of the invention will be described with reference to FIGS. 1 to 3. In these figures, reference letter A indicates the entirety of a hub unit as a bearing device. Here, the hub unit A is of the type to be used in a driven wheel of a vehicle. Reference numeral 1 indicates a hub wheel as a shaft; numeral 2 indicates a double row angular contact ball bearing with vertex of contact angles outside of bearing, as a rolling bearing; and numeral 3 indicates a caulked portion.

The hub wheel 1 includes an annular plate 11 and a journal 12. On the annular plate 11, there is mounted a not-shown wheel. The journal 12 fits the bearing 2 thereon and has the caulked portion 3 formed at its axial end for fixing the bearing 2.

The bearing 2 includes: an inner ring 21 having a single track to be fitted on a radially smaller outer circumference of the journal 12; a single outer ring 22 having two rows of track grooves; a plurality of balls 23 arranged in the two rows; and two crowned retainers 24 and 25. The bearing 2 is constructed to a radially larger outer circumference 12b of the journal 12 of the hub wheel 1 as one inner ring. The outer ring 22 is provided at its outer circumference with a radially outward flange 26, through which it is irrotationally mounted on a not-shown shaft case.

This first embodiment is characterized in the shape of the caulked portion 3 of the journal 12 of the hub wheel 1.

At the outer end face of the caulked portion 3, more specifically, the region from a bending start point Y to an outer circumferential edge is formed of a composite curve joining curved surfaces of three different radii of curvature r1, r2 and r3, as shown in FIG. 2. These three radii of curvature r1, r2 and r3 are preferred to have such relations that the radius of curvature of the curved surfaces on the radially outer side is the larger, i.e., r1<r2<r3.

Here will be described a process for forming the caulked portion 3. First of all, the inner ring 21 is press-fitted, for example, on the radially smaller portion 12a of the journal 12 of the hub wheel 1. Then, a cylindrical portion, as formed on the free end side of the journal 12, is rolled-caulked by using a caulking jig 90, as has been employed for describing the prior art with reference to FIG. 19.

At this time, the caulking jig 90 is applied at its leading end on the journal 12 and is rolled on a single-dotted line O. Shown in FIG. 3A~FIG. 3C the first to last stages of the entire caulking process are divided into such three stages that the rolling angles θ1 to θ3 are set gradually smaller in the order of θ1>θ2>θ3 as the process advances from the first stage to the third stage.

As a result, while the free end side cylindrical portion of the journal 12 is being bent radially outward, the caulked portion 3 changes the radii of curvature of its external end face sequentially to r1, r2 and r3 at the individual stages so that it takes the external end face shape having the composite curved surfaces, as shown in FIG. 2.

Since the pressure is thus adjusted in the direction to become sequentially weaker at the individual stages of the caulking process, the entire area of the caulked portion 3 to abut against the outer end face of the inner ring 21 can be pressed substantially homogeneously while minimizing the axial compression of the caulked portion 3, to make the entire axial thickness of the caulked portion 3 larger than that of the example of the prior art. In the caulked portion 3 thus achieved in this caulking mode, therefore, the resistance to the coming-out of the bearing 2 can be made higher than that of the prior art.

Here, the first preferred embodiment thus far described can be modified into the following modes.

Figure 4:
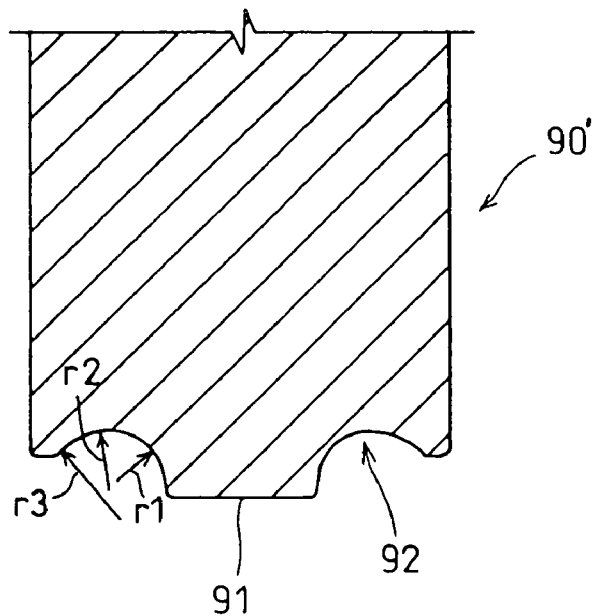
FIG. 4 is a longitudinal side elevation of a rolling-caulking jig to be used in another caulking mode of the invention.

(1) In the first embodiment, the rolling angle for the rolling-caulking treatment is adjusted to form the composite curved surfaces on the outer end face of the caulked portion 3. By using a rolling-caulking jig 90' shown in FIG. 4, however, the rolling angle may be fixed at a substantially constant value. The jig 90', as shown in FIG.

4, is presented for forming the caulked portion 3, as shown in FIG. 2. The jig 90' has such an annular recess 92 in the outer circumference of a protrusion 91 of its leading end that its inner bottom face is formed, for example, into composite curved surfaces having the three radii of curvature r1, r2 and r3. By using this jig 90', a rolling-caulking treatment at the predetermined angle θ is performed in the mode, as has been described in connection with the example of the prior art with reference to FIG. 19. In this modification, the shape of the inner bottom face of the recess 92 is transferred to the outer end face of the caulked portion 3 at the final stage of the rolling-caulking treatment.

(2) In the first preferred embodiment, the three composite curved surfaces are formed on the outer end face of the caulked portion 3 but may be replaced by two composite curved surfaces or by more than three composite curved surfaces.

Figure 5:
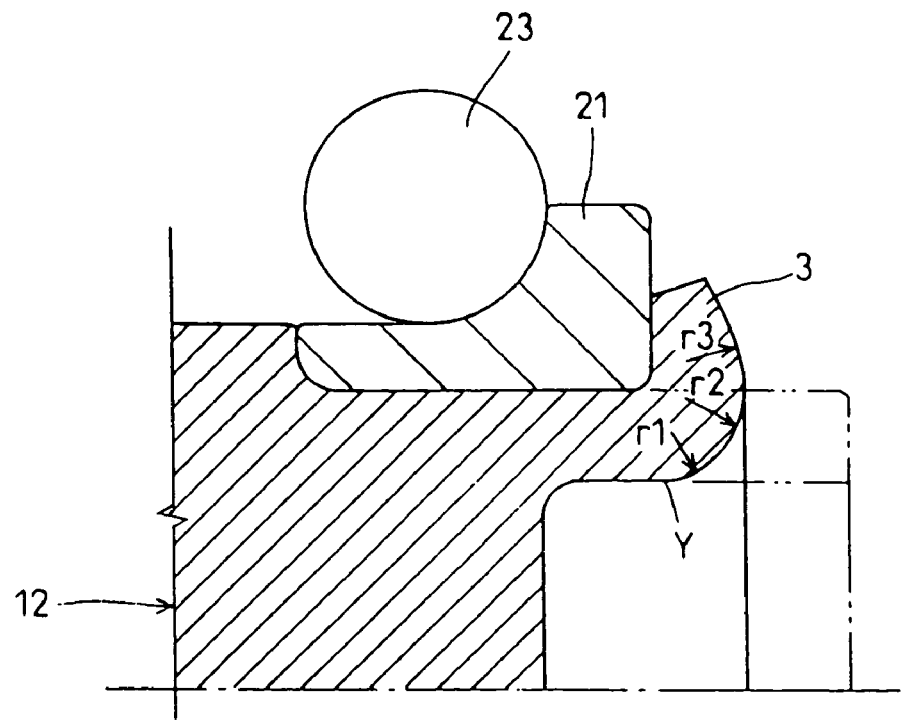
FIG. 5 corresponds to FIG. 2 but shows a modified example of the first embodiment.

(3) In the first embodiment, the outer circumferential edge side of the caulked portion 3 may be pressure more strongly at the last stage of the caulking process than at the preceding stages, to form the caulked portion 3 having a roundish shape on the outer circumferential edge side, as exemplified in a modification shown in FIG. 5. Since a higher pressure is applied in this modification at the final stage than at the intermediate stages of the caulking process, the axial thickness of the outer circumferential side of the caulked portion 3 is smaller than that of the aforementioned embodiment. In this mode, however, it is possible to hardly cause the phenomenon that the outer circumferential edge of the caulked portion 3 comes out due to a springback immediately after the caulking treatment. As a result, the coming-out resistance of the bearing 2 can be enhanced from that of the aforementioned embodiment.

SECOND EMBODIMENT OF THE INVENTION

Figure 6:
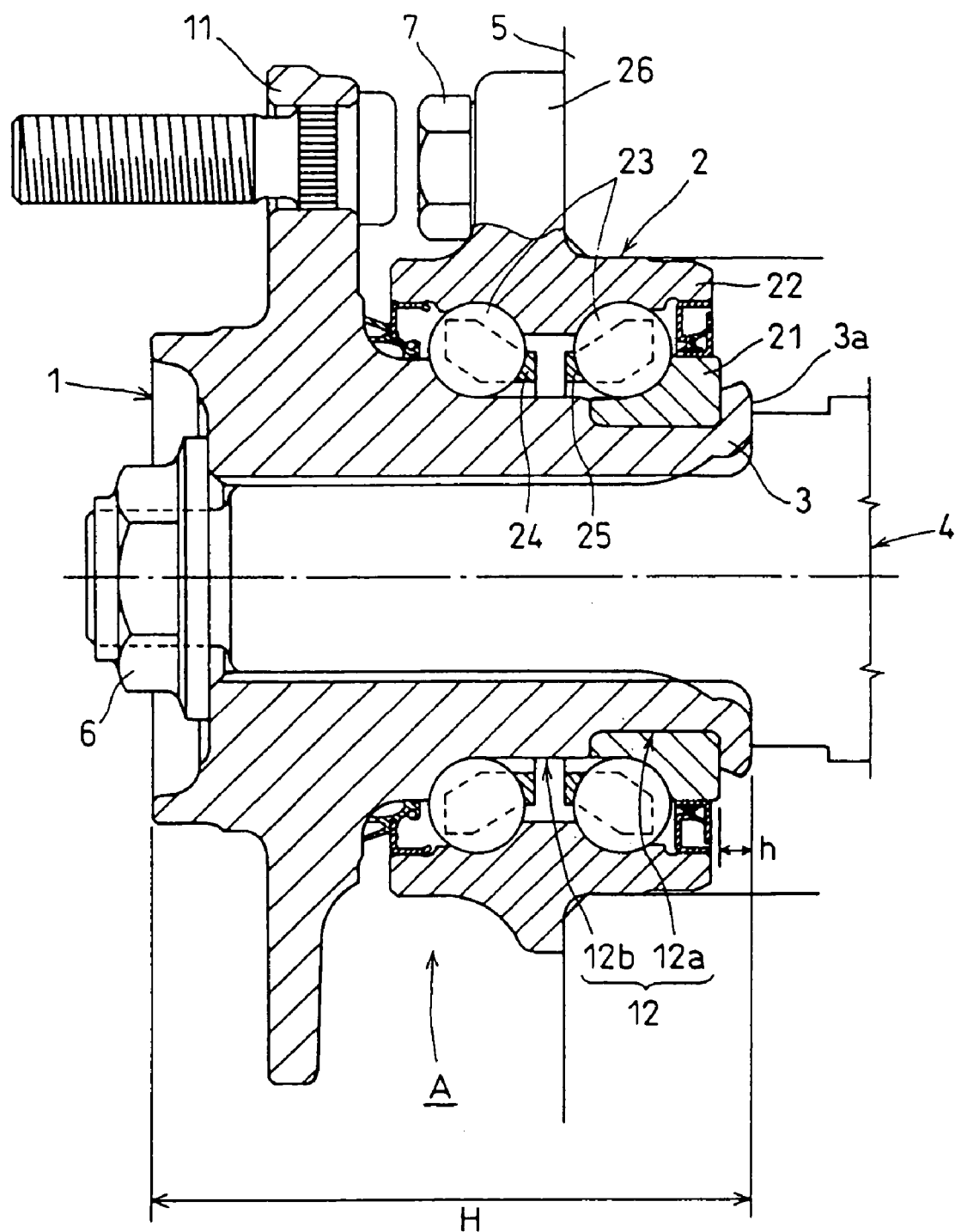
FIG. 6 is a longitudinal side section of a vehicular hub unit according to a second preferred embodiment of the invention.
Figure 7:
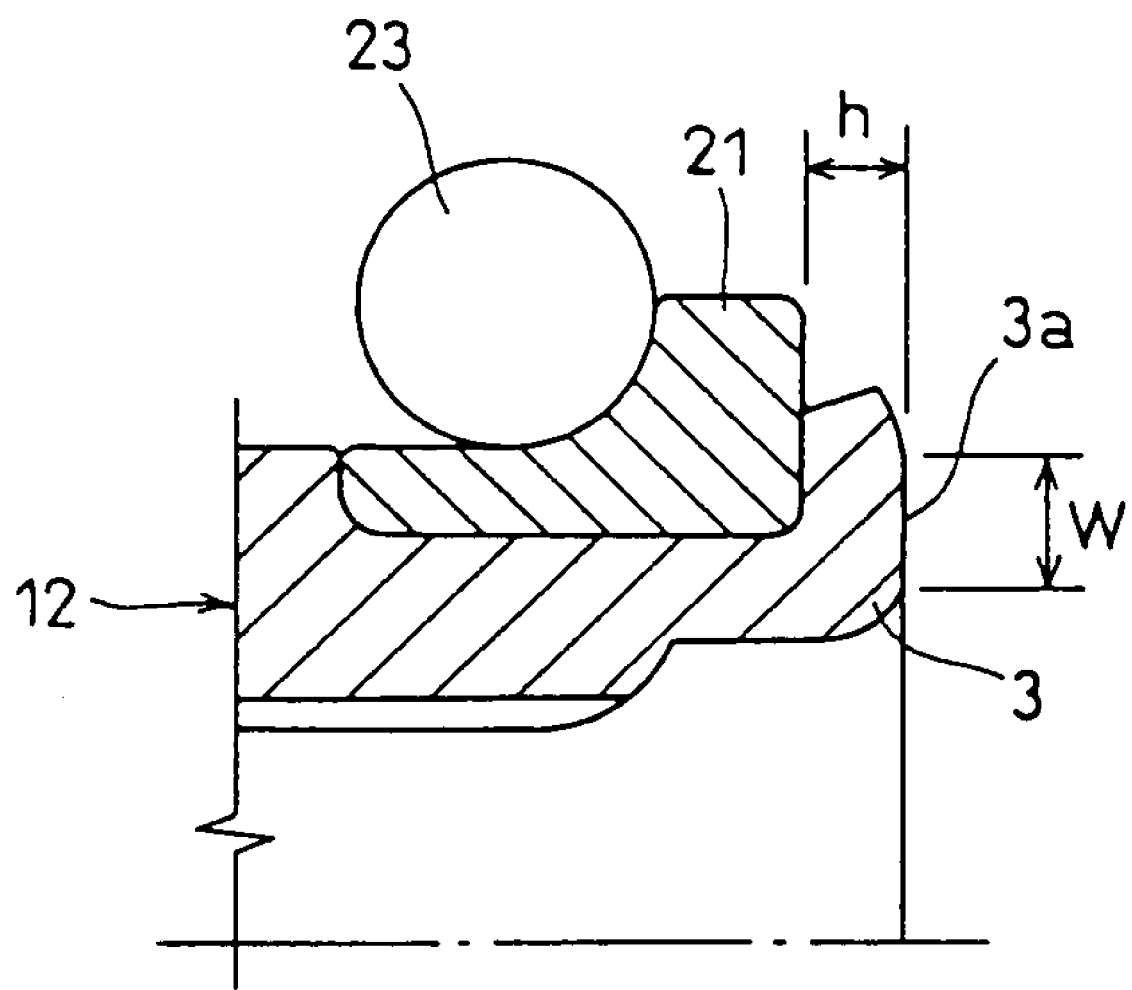
FIG. 7 is an enlarged section of the caulked portion of FIG. 6.

A second preferred embodiment of the invention will be described with reference to FIGS. 6 to 8. The hub unit A to be exemplified in this second embodiment is of the type to be used with the drive wheels of a vehicle and is interposed between a drive shaft 4 and a shaft case 5 of the vehicle. Specifically, the journal 12 of the hub wheel 1 is attached to the drive shaft 4, and the outer ring 22 of the bearing 2 is attached to the shaft case 5. In more detail, the journal 12 of the hub wheel 1 is splined to the drive shaft 4 and coupled to the same by using a nut 6, and the outer ring 22 is coupled at its flange 26 to the shaft case 5 by using bolts 7.

In this second embodiment, the caulked portion 3 to be formed at the journal 12 of the hub wheel 1 has a radial flat face 3a formed at a radially intermediate portion W of its outer end face. This flat face 3a is formed into an annular shape. In this caulked portion 3, the radially inner region and the radially outer region of the flat face 3a are formed into roundish shapes.

In the caulked portion 3, the flat face 3a is located at the axially outermost position. As a result, the flat face 3a provides a reference plane for determining the axial width size h of the caulked portion 3 so that the entire length H of the hub unit A can be easily set by managing that flat face 3a. This flat face 3a further provides a reference plane for mounting a mounted object (e.g., the drive shaft 4) of the hub unit A, so that the axial size in the mounting state can be managed highly accurately.

Figure 19:
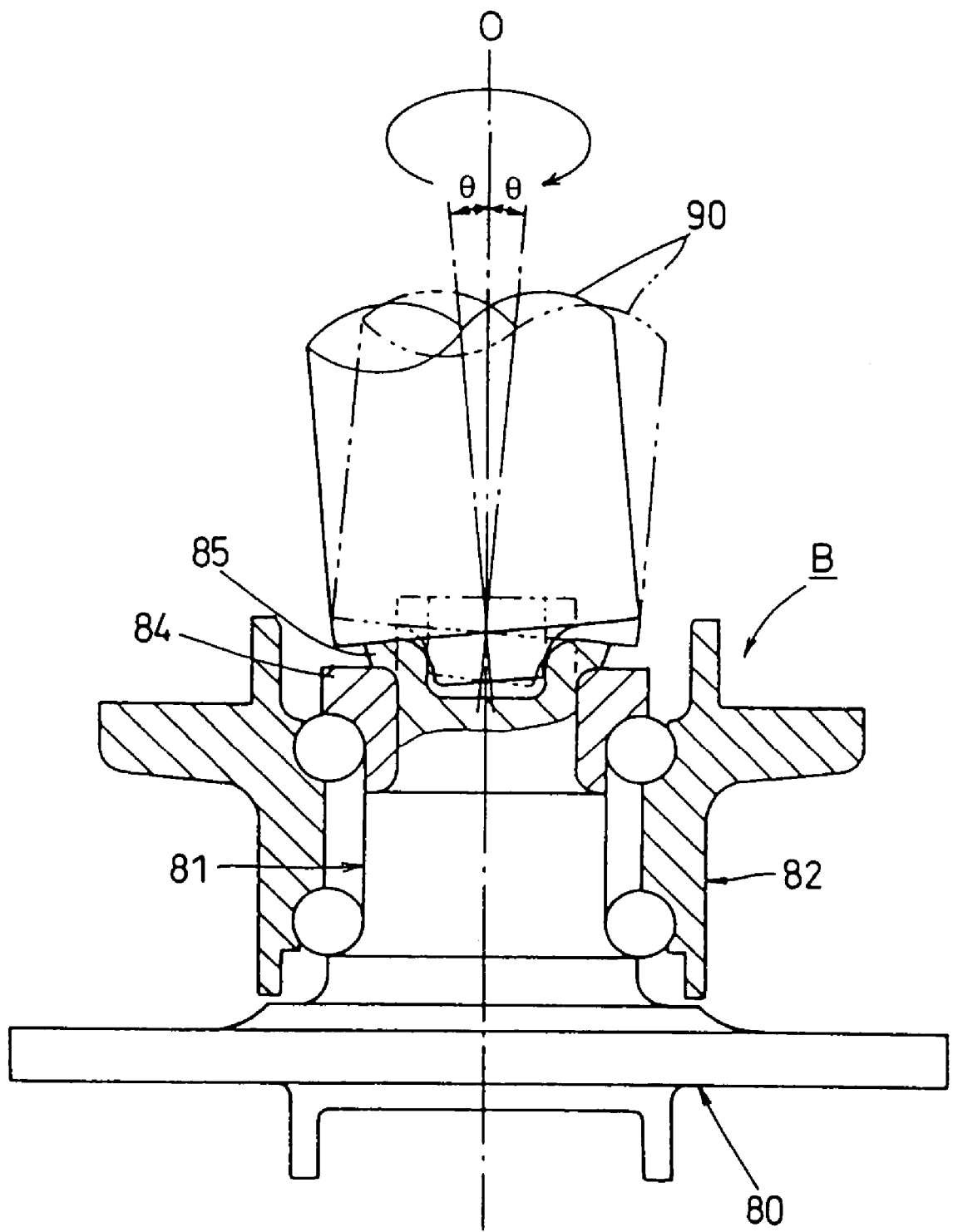
FIG. 19 is an explanatory diagram showing a rolling-caulking mode.

Here will be described a process for forming the caulked portion 3. First of all, the inner ring 21 is fitted, for example, by press-fitting it in the radially smaller portion 12a of the journal 12 of the hub wheel 1. Then, a cylindrical portion 12c at the free end side of the journal 12 is rolled-caulked as in the prior art. As shown in FIG. 19 according to the prior art, more specifically, the leading end of the caulking jig 90 is applied to the cylindrical portion 12c of the journal 12 and is rolled at a predetermined angle α on the single-dotted line O. As a result, the cylindrical portion 12c of the journal 12 is bent radially outward to form the roundish caulked portion 3, as shown in FIG. 8A.

Figure 8A:
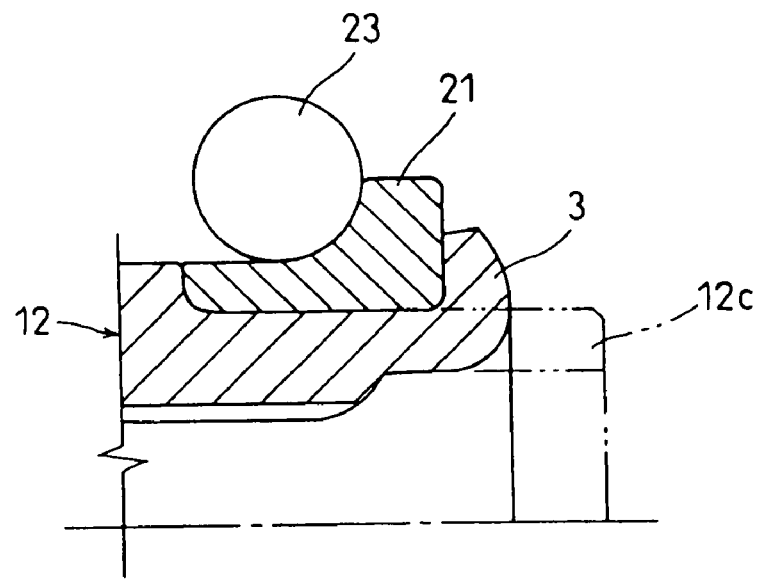
FIGS. 8A and 8B present process diagrams for explaining the caulking mode of the caulked portion of FIG. 7.
Figure 8B:
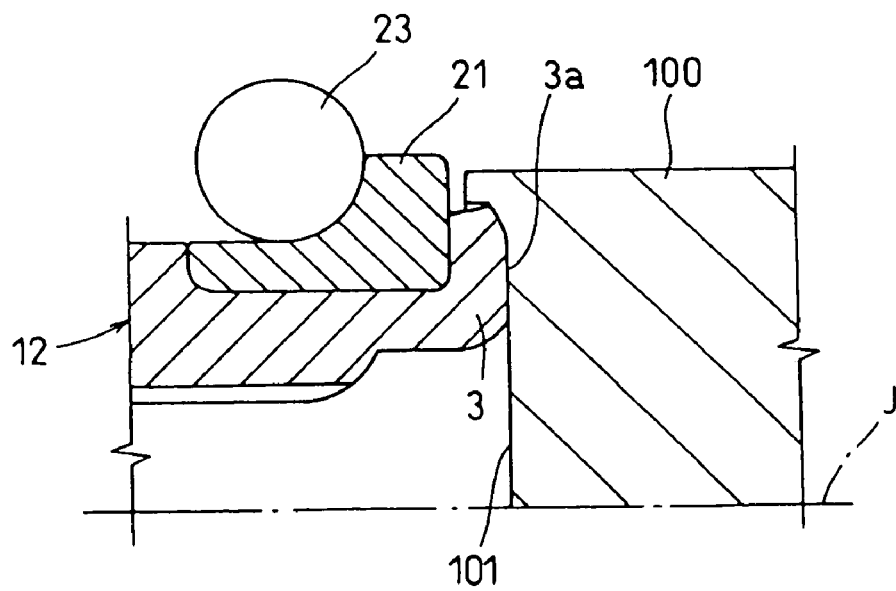

After this, a shaping press jig 100 is applied, as shown in FIG. 8B, to the caulked portion 3 having the shape of FIG. 8A, and the caulked portion 3 is pressed under a predetermined pressure to form the flat face 3a on its outer end face. The press jig 100, as used here, has a recess 101 in its leading end face, and the recess 101 has a bottom face formed substantially in parallel with a radial plane normal to an axis J of the press jig 100. Thus, the caulked portion 3 having the shape of FIG. 8A is pressed with the shaping press jig 100, and the radial flat face 3a is formed in the radially intermediate region W on the outer end face of the caulked portion 3. At this time, moreover, the caulked portion 3 is pressed in its entirety toward the inner ring 21 so that it is well fitted on the outer end face of the inner ring 21.

Thus, the caulked portion 3 is subjected to the compression-shaping treatment by the press after the rolling-caulking treatment so that its entirety can be pushed substantially homogeneously to the outer end face of the inner ring 21 thereby to retain a sufficient resistance to the coming-out load stably at all times.

Although the shaping stability and the sufficient coming-out resistance of the caulked portion 3 can be retained by the caulking process thus far described, on the other hand, the caulking force may be insufficient if the pressing force becomes short.

In order to find out this unlikely shortage, therefore, it is preferable to inspect the caulked portion 3 visually. For this visual inspection, the state of the flat face 3a of the caulked portion 3 is examined noting that the flat face 3a provides a shaping feature. Here, the annular flat face 3a must be neatly formed if the caulked portion 3 is entirely well fitted on the inner ring 21. If the caulked portion 3 partially floats over the inner ring 21, however, its flat face 3a is formed to have undulations. By employing the state of the flat face 3a as the decision standard for the visual inspection of the finish of the caulked portion 3, therefore, the visual decision can be easily made. When the flat face is found to be neatly formed, for example, it can be decided that the entire caulked portion 3 is nondefective because it is well fitted on the inner ring 21. If the flat face 3a is found to have undulations, on the contrary, it can be decided that the caulked portion 3 is defective because its portion floats over the inner ring 21.

If the flat face 3a is positioned at the axially outermost end of the caulked portion 3, as described above, it provides a reference plane for determining the axial width h of the caulked portion 3. By managing this flat face 3a, therefore, the entire length H of the vehicular hub unit A can be managed highly accurately. On the other hand, the flat face 3a further provides a mounting reference plane of the hub unit A for an object to be mounted, so that the axial size in the mounted state can also be managed highly accurately.

THIRD EMBODIMENT OF THE INVENTION

Figure 9:
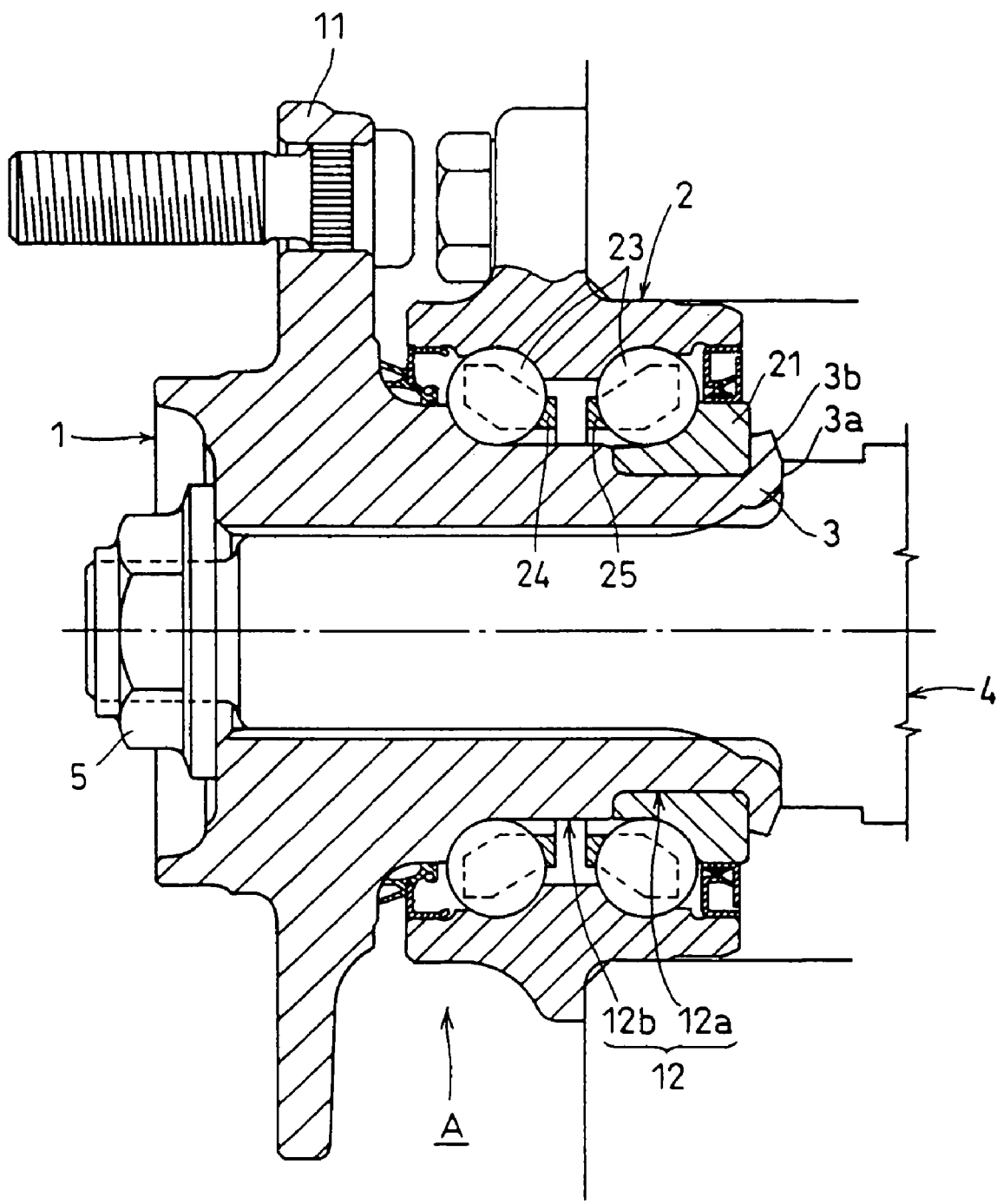
FIG. 9 is a longitudinal side section of a vehicular hub unit according to a third preferred embodiment of the invention.
Figure 10:
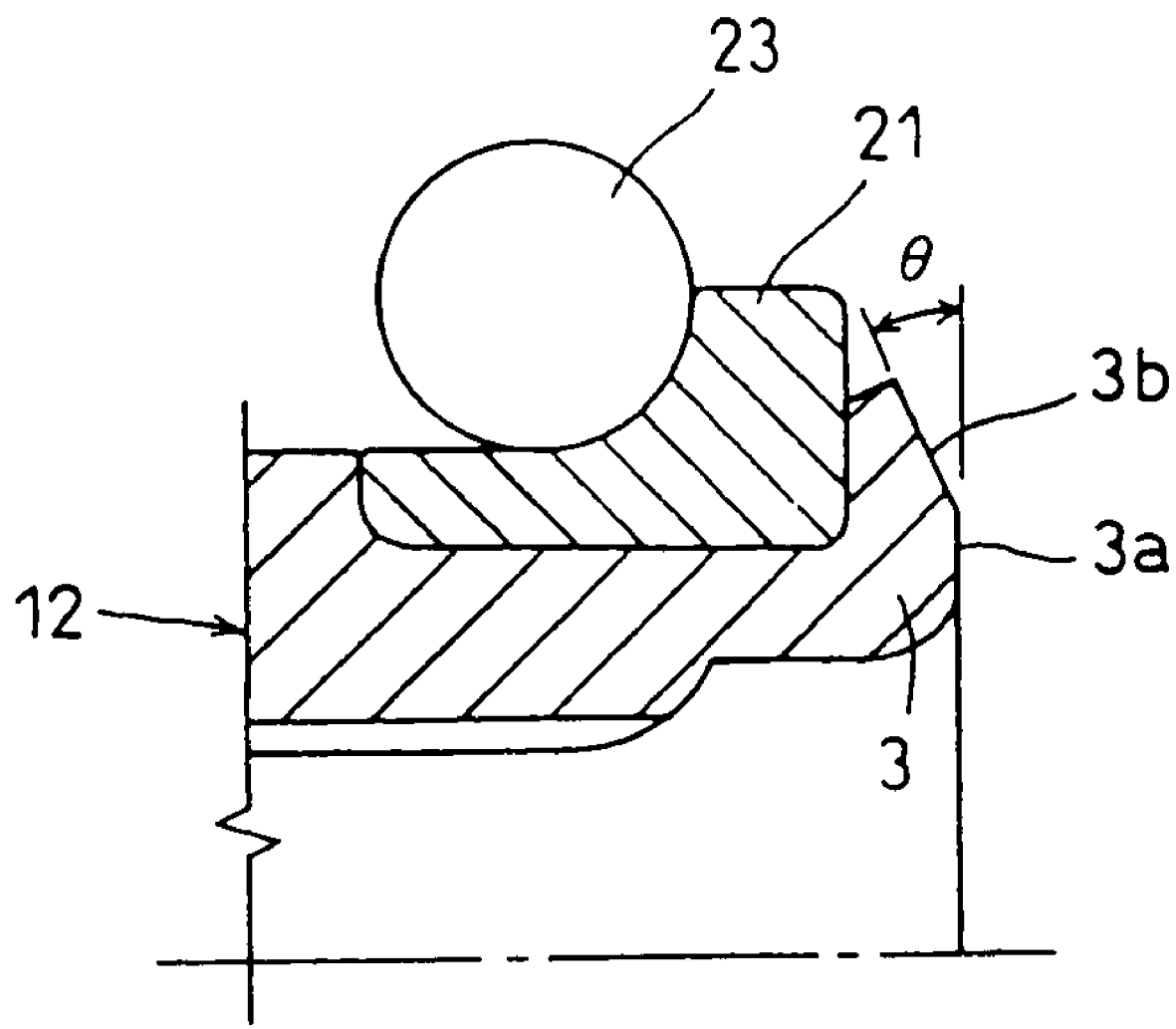
FIG. 10 is an enlarged section of the caulked portion of FIG. 9.

A third preferred embodiment of the invention will be described with reference to FIGS. 9 to 11. In this third embodiment, the flat face 3a is formed in the radially intermediate region at the outer end face of the caulked portion 3, and a tapered face 3b sloped at a predetermined angle θ with respect to a virtual plane in the radial direction is formed on the radially outer region of the flat face 3a.

Figure 11A:
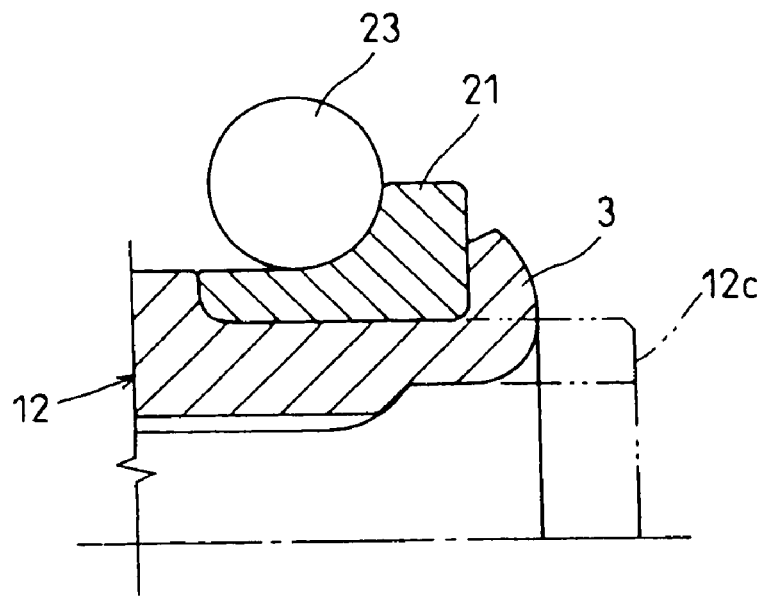
FIGS. 11A and 11B present process diagrams for explaining the caulking mode of the caulked portion of FIG. 10.
Figure 11B:
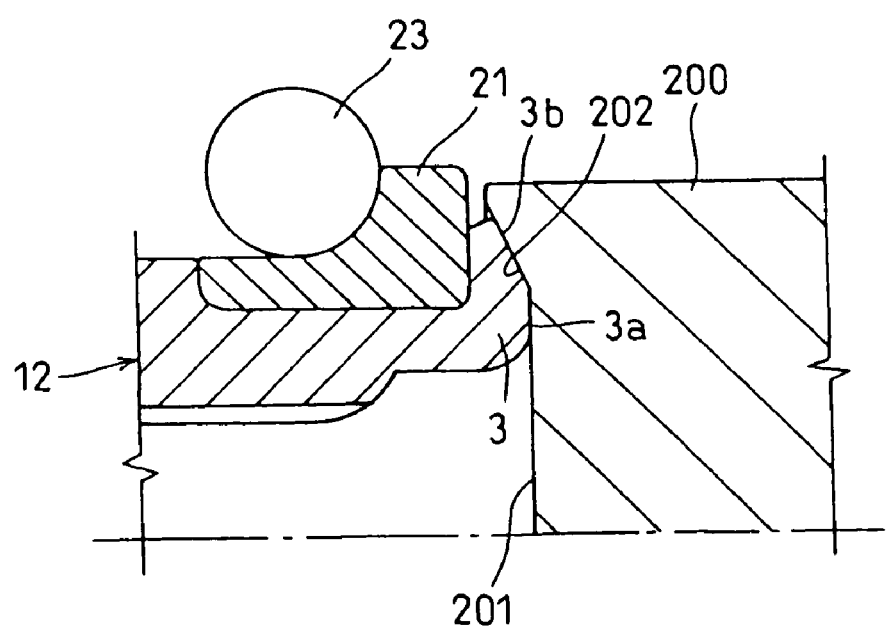

In order to form this caulked portion 3, a rolling-caulking treatment is performed at first as in the foregoing second embodiment. As shown in FIG. 19 according to the prior art, more specifically, the caulking jig 90 is applied at its leading end to the cylindrical portion 12c of the journal 12 and is rolled at the predetermined angle α on the single-dotted line O. As a result, the cylindrical portion 12c of the journal 12 is bent radially outward to form the roundish caulked portion 3, as shown in FIG. 11A. After this, a shaping press jig 200 is applied to the caulked portion 3, as shown in FIG. 11B, to press the outer end face of the caulked portion 3 under a predetermined pressure to form the flat face 3a thereon and the tapered face 3b, which is sloped at the predetermined angle θ with respect to the radial plane, on the radially outer region of the flat face 3a. The press jig 200 to be used herein has a recess 201 formed on its leading end face and has a tapered face 202 diverging toward the opening on the bottom corner of the recess 201.

This third embodiment can achieve actions and effects similar to those of the foregoing second embodiment. In addition, the outer circumferential edge of the caulked portion 3 is pushed in the pressing process toward the inner ring 21 so that the outer circumferential edge of the caulked portion 3 can be prevented from any springback immediately after shaped, to ensure the coming-out resistance, as designed.

FOURTH EMBODIMENT OF THE INVENTION

Figure 13:
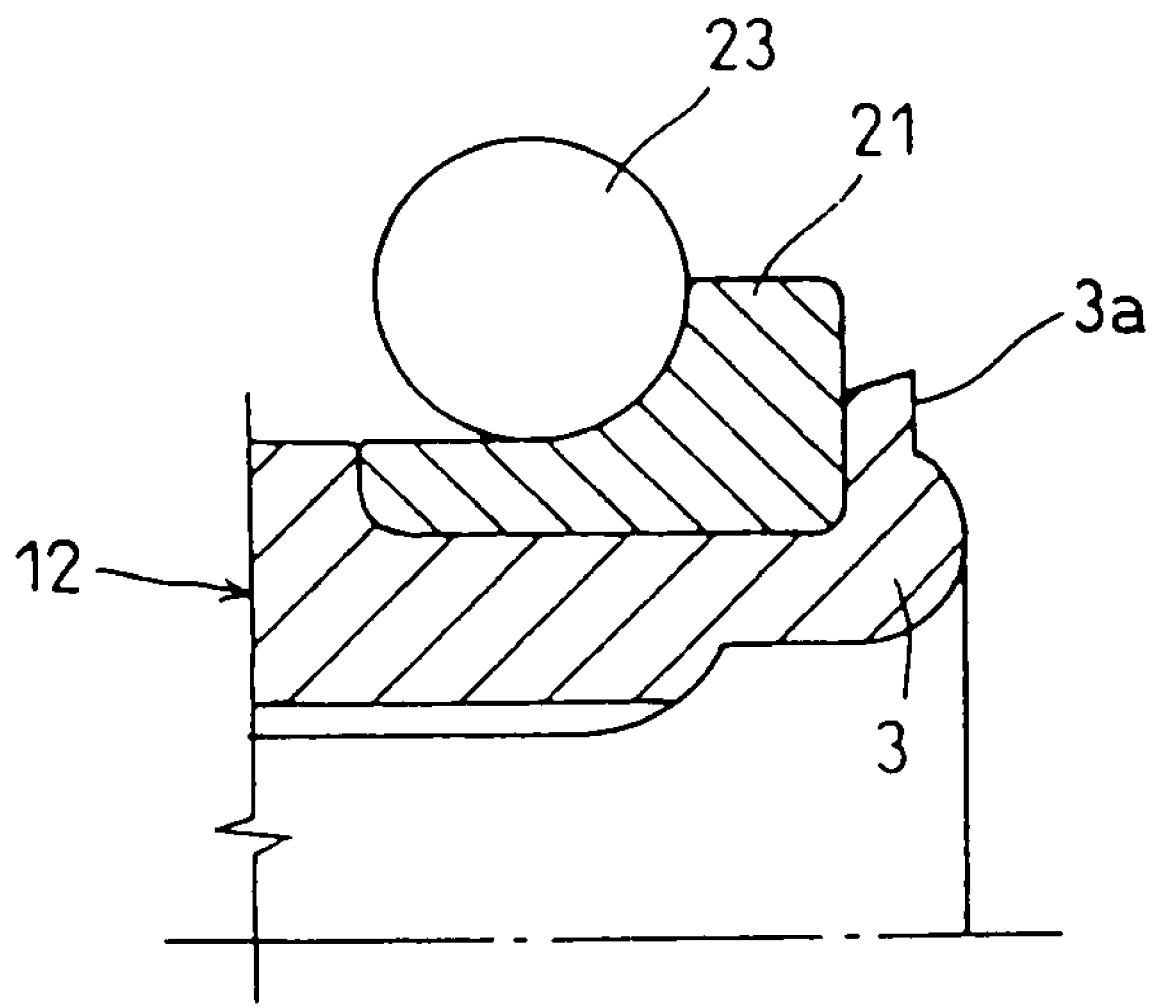
FIG. 13 is an enlarged section of the caulked portion of FIG. 12.

A fourth preferred embodiment of the invention will be described with reference to FIGS. 12 to 14. In this fourth embodiment, the flat face 3a is formed in the radially outer region at the outer end face of the caulked portion 3.

Figure 14A:
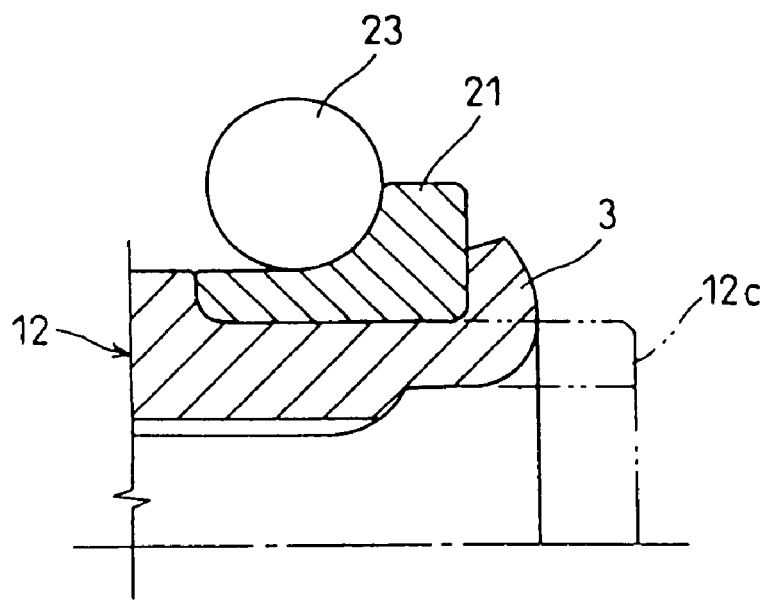
FIGS. 14A and 14B present process diagrams for explaining the caulking mode of the caulked portion of FIG. 13.
Figure 14B:
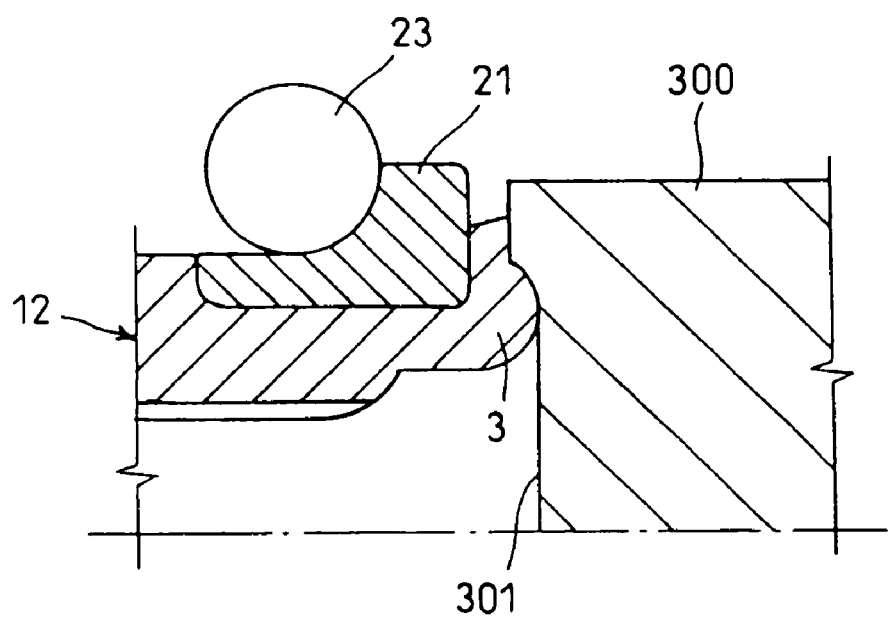

In order to form this caulked portion 3, a rolling-caulking treatment is performed at first as in the foregoing second embodiment. As shown in FIG. 19 according to the prior art, more specifically, the caulking jig 90 is applied at its leading end to the cylindrical portion 12c of the journal 12 and is rolled at the predetermined angle α on the single-dotted line O. As a result, the cylindrical portion 12c of the journal 12 is bent radially outward to form the roundish caulked portion 3, as shown in FIG. 14A. After this, a shaping press jig 300 is applied to the caulked portion 3, as shown in FIG. 14B, to press the outer end face of the caulked portion 3 under a predetermined pressure to form the flat face 3a on the radially outer side. The press jig 300 to be used herein has a recess 301 formed on its leading end face so that the aforementioned flat face 3a is formed with the raised brim of the outer circumference of the recess 301.

According to this fourth embodiment, as in the foregoing second embodiment, there can be achieved such actions and effects that the shape of the caulked portion 3 is stabilized to retain a sufficient coming-out resistance, and that the decision at the time of a visual inspection is facilitated. Since the flat face 3a is not positioned at the axially outermost end of the caulked portion 3, however, there cannot be achieved such actions and effects that the axial width size of the caulked portion 3 and the axial size in the mounted state can be easily managed.

Here, the foregoing second to fourth embodiments can be modified in the following manners.

Figure 15:
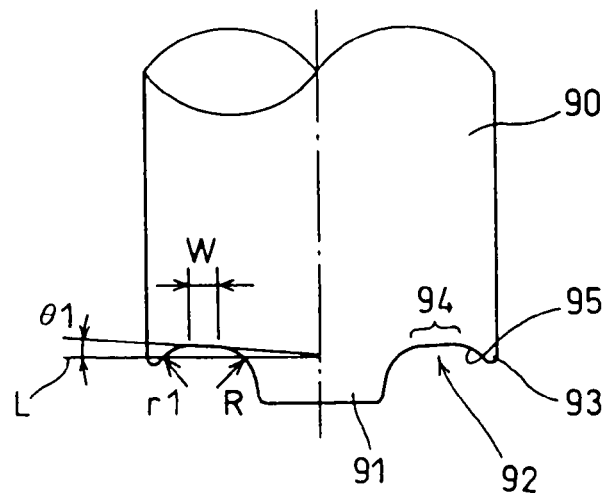
FIG. 15 is a side elevation showing the shape of a rolling-caulking jig for achieving the caulked portion of FIG. 7.
Figure 16:
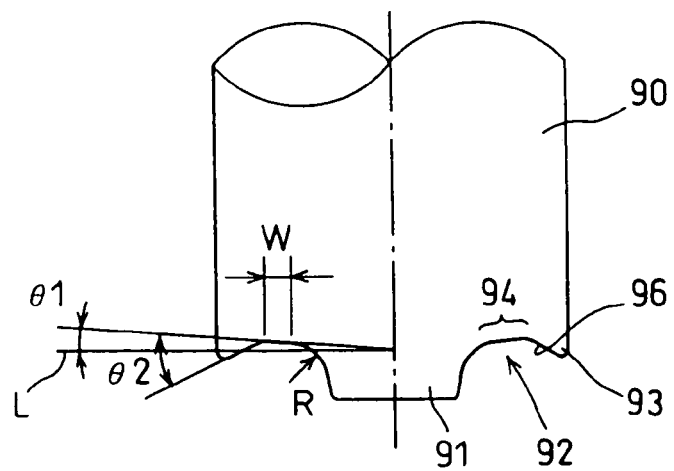
FIG. 16 is a side elevation showing the shape of a rolling-caulking jig for achieving the caulked portion of FIG. 10.
Figure 17:
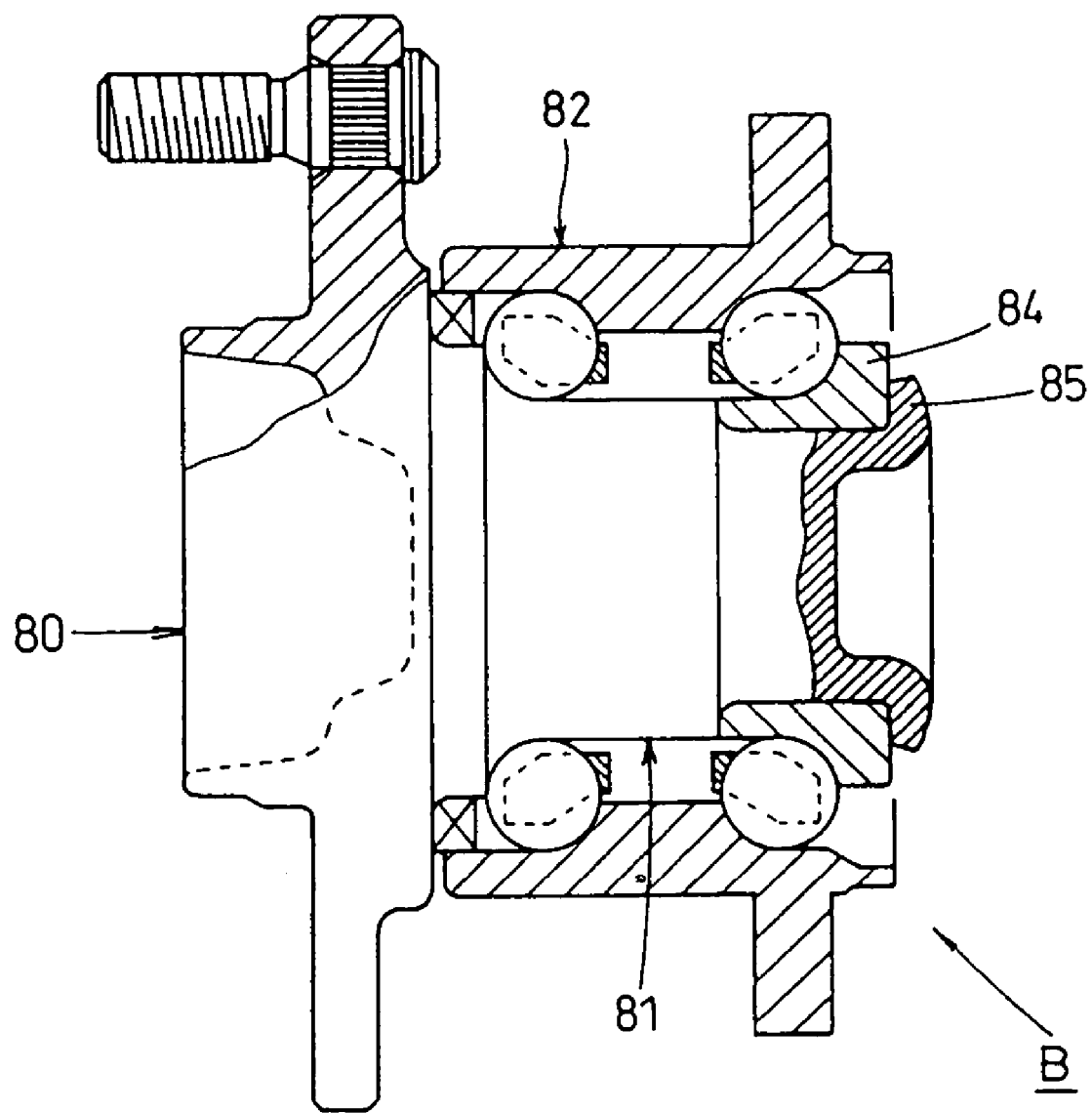
FIG. 17 is a longitudinal side section of a vehicular hub unit of an example of the prior art.

(1) In the foregoing second to fourth embodiments, the rolling-caulking treatment and the pressing treatment are used together to form the flat face 3a on the caulked portion 3. However, the caulked portions 3 of the second and third embodiments can be formed exclusively by the rolling-caulking treatment. In this case, the shape of the leading end of the jig 90 is devised, as shown in FIGS. 15 and 16. More specifically, the modification of the jig 90 of FIG. 15 is constructed such that a slope 94 inclined at a predetermined angle θ1 with respect to a virtual plane L extending in the radial direction is formed on the bottom of an annular recess 92 between the protrusion 91 formed at the center of the leading end face of the jig 90 and an annular brim 93 formed at the outer circumferential edge of the leading end face, and such that a curved surface 95 of a predetermined radius of curvature r1 is formed in the recess 92 closer to the brim 93. Here, a curved surface of a predetermined radius of curvature R is formed in the recess 92 closer to the protrusion 91. On the other hand, the jig 90 of FIG. 16 is substantially identical to the aforementioned jig 90 of FIG. 15 but is different in that the inner face of the recess 92 on the side of the brim 93 is formed of not the curved surface 95 but a slope 96 which is inclined at a predetermined angle θ2 with respect to the slope 94. For either of these jigs 90, the flat face 3a can be formed on the caulked portion 3 with the slope 94 by setting the angle θ1 of the slope 94 equal to the rolling angle α in the rolling-caulking process. With the curved face 95 and the slope 96 of the jigs 90, on the other hand, the radially outer side 3b of the caulked portion 3 is rounded or tapered. By using these jigs 90, the pressing step of the foregoing second and third embodiments can be omitted to lower the production cost.

In the foregoing first to fourth embodiments, on the other hand, the bearing device has been exemplified by the vehicular hub unit but can be applied to all bearing devices such as the guide roller of a slide door of an automobile.

While there has been described what is at present considered to be preferred embodiments of this invention, it will be understood that various modifications may be made therein, and it is intended to cover in the appended claims all such modifications as fall within the true spirit and scope of this invention.

The invention claimed is:

1. A bearing device comprising:
   a shaft having one axial end formed into a cylindrical shape; and
   a rolling bearing fitted on the one axial end of said shaft, wherein said rolling bearing is so fixed on said shaft as to be prevented from coming out by rolling-caulking the one axial end of said shaft to bend it radially outward and by pushing the bent caulked portion onto an outer end face of an inner ring of said rolling bearing; and
   wherein said one axial end of said shaft is formed to have an axially outer surface which includes a rounded portion at a radially inner portion, a flat face portion forming a radially intermediate portion extending outwardly in a radial direction from said rounded portion and a tapered face portion extending radially outwardly from said flat face portion.

2. The bearing device according to claim 1, wherein said tapered face portion is sloped at an angle with respect to a plane in the radial direction.

3. The bearing device according to claim 1, wherein said tapered face and said flat face are formed by pushing the bent caulked portion with a shaping press jig.

* * * * *